(12) United States Patent
Oblizajek et al.

(10) Patent No.: US 8,271,163 B2
(45) Date of Patent: Sep. 18, 2012

(54) METHOD FOR ATTENUATING SMOOTH ROAD SHAKE IN AN ELECTRIC POWER STEERING SYSTEM

(75) Inventors: Kenneth L. Oblizajek, Troy, MI (US); Derek K. Hogland, Brighton, MI (US); John D. Sopoci, Commerce Township, MI (US); Wen-Hou Ma, Novi, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 457 days.

(21) Appl. No.: 12/565,018

(22) Filed: Sep. 23, 2009

(65) Prior Publication Data

US 2011/0071729 A1 Mar. 24, 2011

(51) Int. Cl.
*B62D 6/00* (2006.01)

(52) U.S. Cl. ............ 701/42; 701/41; 180/446

(58) Field of Classification Search .......... 701/41, 701/42, 43; 180/410, 413, 443, 444, 446, 180/441

See application file for complete search history.

(56) References Cited

U.S. PATENT DOCUMENTS

| | | | |
|---|---|---|---|
| 4,800,974 A * | 1/1989 | Wand et al. | 180/446 |
| 5,668,722 A | 9/1997 | Kaufmann et al. | |
| 5,982,067 A | 11/1999 | Sebastian et al. | |
| 6,714,858 B2 | 3/2004 | Oblizajek et al. | |
| 7,233,850 B2 * | 6/2007 | Nakano et al. | 701/41 |
| 8,108,105 B2 * | 1/2012 | Saruwatari et al. | 701/41 |
| 2009/0018726 A1 * | 1/2009 | Saruwatari et al. | 701/41 |
| 2009/0125186 A1 | 5/2009 | Recker et al. | |
| 2009/0224502 A1 * | 9/2009 | Yamawaki et al. | 280/124.108 |
| 2009/0294206 A1 | 12/2009 | Oblizajek et al. | |

FOREIGN PATENT DOCUMENTS

| | | |
|---|---|---|
| DE | 2249655 A1 | 4/1974 |
| DE | 102004051338 A1 | 4/2006 |
| DE | 102005003180 A1 | 7/2006 |

OTHER PUBLICATIONS

U.S. Appl. No. 12/326,684, filed Dec. 2, 2008 to Lin Wang, et al, entitled :"Methods and Systems for Controlling Motor Current in Steering Systems of Vehicles Equipped with Electric Steering Assist".

German Office Action dated Mar. 5, 2012 for German Application serial No. 102010046072.9, corresponding to U.S. Appl. No. 12/565,018.

* cited by examiner

*Primary Examiner* — Richard M. Camby

(57) ABSTRACT

A method to reduce vehicular sensitivity to torsional smooth road shake (SRS) at the steering wheel provided by selectively increasing reverse driven-impedance of the steering system via an effective dynamic tuned vibration absorber comprising the existing power steering motor inertia supported on the torsional stiffness of the gearing to the rack in the case of a REPS system, or of the column rotary shaft in the case of a CEPS system.

27 Claims, 9 Drawing Sheets

METHOD FOR ATTENUATING SMOOTH ROAD SHAKE IN AN ELECTRIC POWER STEERING SYSTEM

TECHNICAL FIELD

The present invention relates to electric power steering systems, and more particularly to a methodology for dynamically attenuating smooth road shake at the steering wheel.

BACKGROUND OF THE INVENTION

Electric power steering provides a steering assist to a motor vehicle driver as the driver turns the steering wheel in either direction of rotation. The electric motor of the electric power steering (EPS) system which serves to assist the steering by the driver can be connected to the rack of the steering system (an REPS system) or be connected to the steering column (a CEPS system), which are exemplified at FIGS. 1A and 1B.

FIG. 1A depicts an example of a CEPS system. A motor vehicle 40 is provided with an electric power steering system 24. The electric power steering system 24 may comprise a conventional rack and pinion steering mechanism 36, which includes a toothed rack (not shown) and a column pinion gear (not shown) under gear housing 52. As the steering wheel 26 is turned, an upper steering shaft 29 turns a lower shaft 51 through a rotary joint 34; and the lower steering shaft 51 turns the column pinion gear. Rotation of the column pinion gear moves the rack, which moves tie rods 38 (only one shown), which move steering knuckles 39 (only one shown) to turn tires 42 (only one shown).

The electric power assist is provided through a controller 16 and a power assist actuator comprising an electric motor drive 46. The controller 16 receives electric power from a vehicle electric power source 10 through a line 12, a signal representative of the vehicle velocity on line 14 and column pinion gear angle from a column rotational position sensor 32 on line 20. As the steering wheel 26 is turned, a torque sensor 28 senses the torque applied to steering wheel 26 by the vehicle operator and provides an operator torque signal to controller 16 on line 18. In response to the vehicle velocity, operator torque, and in some cases, column pinion gear angle signals received, the controller 16 derives desired electric motor currents and provides such currents through a bus 22 to the electric motor drive 46, which supplies motor assist to steering shaft 29 through worm gear 47 and motor pinion gear 48. Details hereof are described in U.S. Pat. No. 5,982,067, issued to Sebastian et al on Nov. 9, 1999, the entire disclosure of which is hereby herein incorporated by reference. An example of an embodiment of the controller 16 is described in U.S. Pat. No. 5,668,722, issued to Kaufmann et al on Sep. 16, 1997, the entire disclosure of which is hereby incorporated herein by reference.

FIG. 1B depicts an example of an REPS system. The electric power steering system 60 comprises a conventional rack and pinion steering mechanism 62, which includes a toothed rack 64 which is connected to the tie rods (not shown) for directing the turning of the tires (not shown). The steering column has a lower assembly 66 having a column pinion gear 68 which is meshed with the teeth 70 of the toothed rack 64 so that turning of the steering column applies a torque at the toothed rack that results in the toothed rack translating left or right, depending on the direction of the turning of the steering column. The electric motor drive 72 of the electric power steering system is gearingly connected to the toothed rack by a motor pinion gear 74, wherein the motor pinion gear may be mechanically connected, for example, by a belt or gear interface via, for example, a ballscrew mechanism 76. The electrical operation is as generally described with respect to FIG. 1A, as it is adapted to the configuration of FIG. 1B.

Additional sensors for both CEPS and REPS are available and oftentimes implemented to yield motor rotor position, enabling differentiation of these signals with respect to time, ultimately providing estimates of rotor velocity and acceleration. The use of these differentiated signals to provide advantageous electrical control characteristics is described in subsequent paragraphs and will become obvious to the reader. In the case of some brushless motor mechanizations, furthermore, the rotor position is also used for distributing power magnetically to a rotor whose position must be known relative to a stationary member, e.g.: stationary windings interacting with a rotatable permanent magnet rotor. Multiple motor configurations are possible for achieving desired mechanical torque at the rotor, such as brushed motors, inductive motors, and synchronous motors as examples. These mechanizations and the practices associated with production of mechanical torques between stationary and rotatable members of motor elements are well known to those skilled in the art of electric motors for not only steering systems but, in general, the creation of mechanical torques through actions of electric motors in appliances, fans, flywheels and other industrial machines using rotatable prime movers.

Nonuniform conditions of the rotating tire, wheel, brake rotor and bearing hubs of a motor vehicle may cause periodic vibrations, in isolation of, or in addition to road induced vibrations on even extremely smooth road surfaces. These vibrations, furthermore, can exhibit a recurrent, periodic torsional vibration at the steering wheel, commonly referred to as "shake", wherein this shake is more pronounced with increasing speed and is most noticeable at speeds greater than, approximately, 50 miles per hour (mph). These nonuniform, periodic conditions cause the rack of the steering system to vibrate with a periodicity related to the periodicity of the shake and is, generally, most notable between about 10 and 20 Hz. The shake may be felt by the driver at the steering wheel as a periodic rotational vibration, known as "smooth road shake" (SRS), generally, most noticeable between about 10 to 20 Hz at speeds, generally, between, approximately, 50 to 100 mph. At 50 mph, smooth road shake occurs at, approximately, 10 Hz, the frequency of which is an approximate linear function of speed such that at 100 mph smooth road shake occurs at, approximately, 20 Hz.

Accordingly, what is needed in the art is some methodology which provides for the attenuation of smooth road shake, particularly a dynamic attenuation responsive to differing speeds of the motor vehicle.

SUMMARY OF THE INVENTION

The present invention is a method to provide a maximum dynamic stiffness to the rack of the electric power steering (EPS) system which is tuned to attenuate smooth road shake (SRS) at the steering wheel.

According to the method of the present invention, reduced vehicular sensitivity to torsional SRS at the steering wheel is provided by selectively increased reverse-driven translational impedance of the steering system by strategic creation of an effective dynamic tuned vibration absorber (TVA) composed of the existing EPS motor inertia supported on the torsional stiffness of the column pinion gearing, connecting shafts, and connecting rotary couplings to the rack in the case of an REPS system, or of the column gearing, connecting shafts and connecting rotary couplings in the case of a CEPS system, collectively referred to as the EPS motor assembly. Reverse-driven translational impedance is the ratio of applied force to rack movement at the rack end in a conceptual configuration of the steering system otherwise identical to that of the in-vehicle configuration of the steering system except that the tie rods are disconnected and a driving force is applied at the rack. In this configuration, the steering wheel remains affixed to the steering system by means of all of the hardware normally used in vehicle, i.e., steering column, shrouds, intermediate connecting shafts, articulating joints, and the like. Measurements of these impedances are also available on laboratory test stands where the steering subsystem is duplicated on the stand, and forces are exerted at the rack end simulating vehicle dynamic conditions wherewith the effects cited herein are observable and quantifiable. In the frequency domain, impedance is the phasor quantity of the ratio of the complex quantities of force by translational displacement for a translating system, and torque by rotational displacement for a rotational system. The term translational rack stiffness is the magnitude of the translational impedance and is a scalar quantity. The term rotary rack impedance may be used to describe the contribution of a motor system attached to the rack (REPS) or the steering shaft (CEPS) and defined by the ratio of the phasors of torque at the attachment by angular displacement at the attachment. The term rotary rack stiffness is the magnitude of the rotary impedance and is a scalar quantity. For the REPS, the rotary rack stiffness and its contribution to the translational rack stiffness are proportional and related by the square of the effective motor shaft-to-rack pinion radius. For the CEPS, the rotary rack stiffness and its contribution to the translational rack stiffness are proportional and related by the square of the gearing ratio at the steering and motor drive connection shafts to effective pinion radius at the rack. These equivalent impedance relationships at the translating and rotating members of the REPS and CEPS systems are typical of many direct and cascaded gearing mechanisms and are commonly used to characterize the dynamics of many conventional geared configurations for similar analyses. All of these descriptions and relationships, furthermore, between the dynamic forces, torques and displacements are well known and commonly practiced by those skilled in the art of dynamics analysis. The term "rack stiffness" may, therefore, apply to either "rotary rack stiffness" or to "translational rack stiffness", per the aforesaid relationships.

The resonant frequency of the mechanically tuned TVA, according to the method of the present invention, is in the vicinity of frequencies commonly encountered for SRS. This resonant frequency is then dynamically varied, as a further aspect of the method according to the present invention, as a function of vehicle speed to advantageously suppress the SRS periodic content, e.g.: via the use of speed-sensitive "inertia-compensation", wherein the term "inertia compensation" refers to the application of a torque by selectively modifying the current in the EPS motor, responsive to the measured or calculated motor rotor acceleration via the $2^{nd}$ time derivative of motor position, intended to either increase or decrease the apparent mechanical total inertia of the motor rotor including the combined effects of the mechanical inertia and the applied acceleration-responsive motor torque. An additional aspect of the method of the present invention includes speed-sensitive compensatory damping reflecting the characteristics of the mechanical source(s) of damping, viz.: EPS motor rotor to ground or in-line torsional shaft damping, wherein in-line torsional shaft damping includes damping of the connection shafts and gear members such that the damping is obtained by relative movement of the connected members, e.g., between motor rotor and connecting pinion or other rotatable link, through small, but non-zero relative angular movement of these connecting members and not their overall movement relative to the housing or supporting structure ("ground"). Application of these velocity-responsive torques is achieved either by actual detection of the relative motion via sensors or inference through the use of partial detection and reliance on the prevailing dynamics to estimate relative motions, followed by the applied motor torques proportional to these velocity motions. The applied velocity-responsive motor torques may be of a polarity to either increase or, more-commonly and consistent with the teachings herein, to decrease the apparent mechanical damping, resulting in advantageous mechanical dynamic properties as described in the following.

The SRS attenuation method according to the present invention includes: providing a mechanically tuned torsional dynamic system (TVA) comprising the EPS motor inertia supported on the connecting gears and shaft to either the rack (REPS system) or the gears and shaft of the steering column (CEPS system); mechanically tuning the TVA with respect to a mid-range of the frequency band of SRS, for example, a frequency of about 15 Hz for an SRS frequency band of approximately 10 Hz to 20 Hz; dynamically shifting the tuning frequency of the TVA by a controller directed speed-sensitive "inertia-compensation", via control of current in the EPS motor, which shifts the effective resonant frequency of the TVA, resulting in a net apparent TVA resonant frequency at the SRS frequency; and controller directed damping control, also via control of current in the motor, that offsets the combination of pre-existing mechanical damping characteristics and controller damping compensation as a consequence of the time lagged inertia compensation used for the majority of the combined mechanical and electronically augmented TVA frequency shifts.

According to the method of the present invention the dynamic tuning of the dynamic tuned vibration absorber is provided by electronic control of the magnetic interaction within the EPS motor, via control of the current in the EPS motor, which effectively provides a simulated change in inertia of the EPS motor rotor, and, thereby, a consequent change in the resonant frequency of the TVA.

The net result of implementation of the SRS attenuation method according to the present invention is a significant multiplicative increase in the rack stiffness at the SRS frequency, rendering the steering gear very stiff for the dynamic loads and reducing the dynamic movement of the rack relative to the housing at and nearby the SRS frequency only. This, in turn, results in reduced steering wheel shake (i.e., small angular back and forth vibrations) at the SRS frequency, whereupon the driver is unaware of the SRS. The frequency-selectivity of the steering gear stiffness also enables separately engineered and controller supplemented desirable dynamics for forward-driven properties affecting preferred steering and handling performance, commonly occurring at lower frequencies.

Accordingly, it is an object of the present invention to provide a method to reduce vehicular sensitivity to torsional SRS at the steering wheel provided by selectively increasing reverse driven-impedance of the steering system via strategic creation of an effective dynamic tuned vibration absorber (TVA) comprising the existing EPS motor inertia supported on the torsional stiffness of the motor pinion gearing, connecting shafts and couplings to the rack in the case of an REPS system or to the column in the case of a CEPS system.

This and additional objects, features and advantages of the present invention will become clearer from the following specification of a preferred embodiment.

DESCRIPTION OF THE PREFERRED EMBODIMENT

Figure 1A:
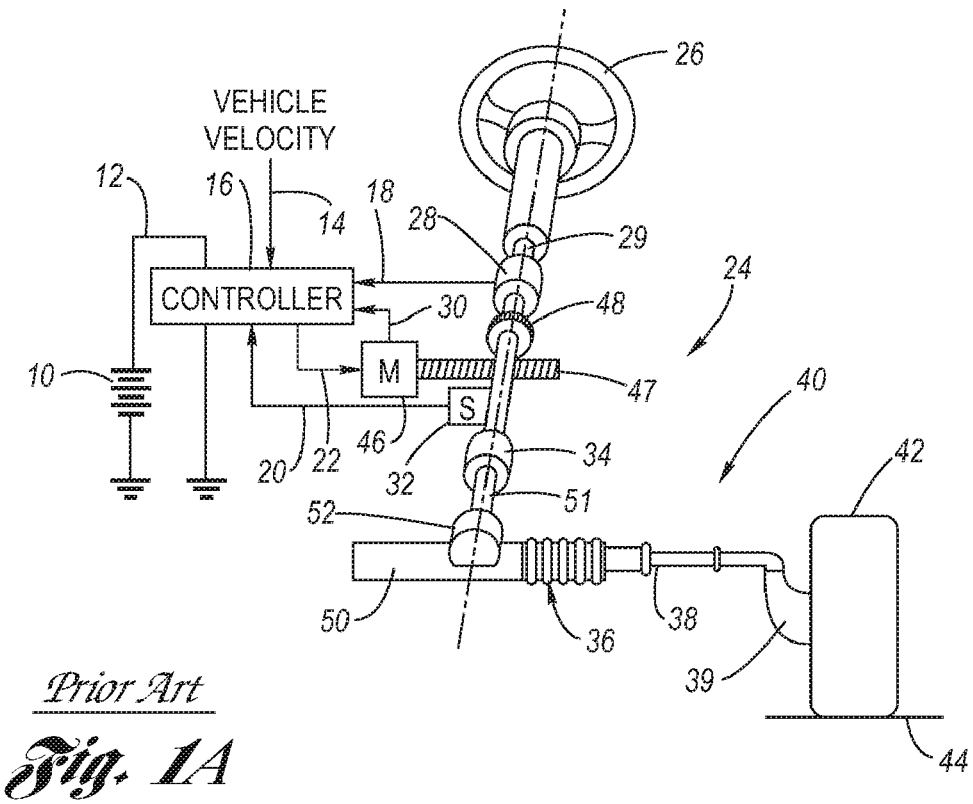
FIG. 1A is a schematic representation of a prior art column electric power steering (CEPS) system.
Figure 1B:
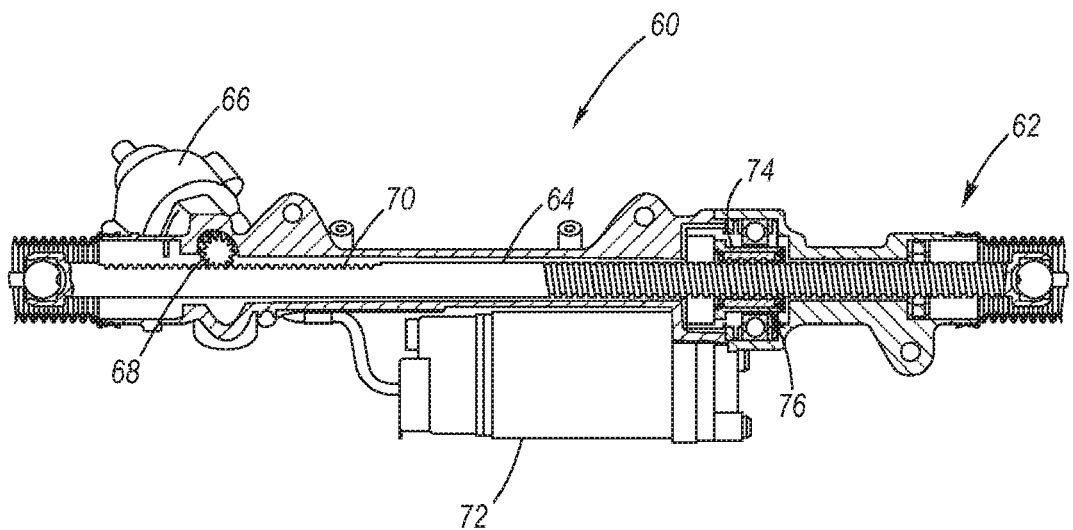
FIG. 1B is a partly sectional view of a prior art rack electric power steering (REPS) system.

Referring now to the Drawing, FIGS. 2 through 5 depict various aspects of a method according to the present invention to dynamically attenuate the smooth road shake (SRS) at the steering wheel of a motor vehicle.

Figure 2:
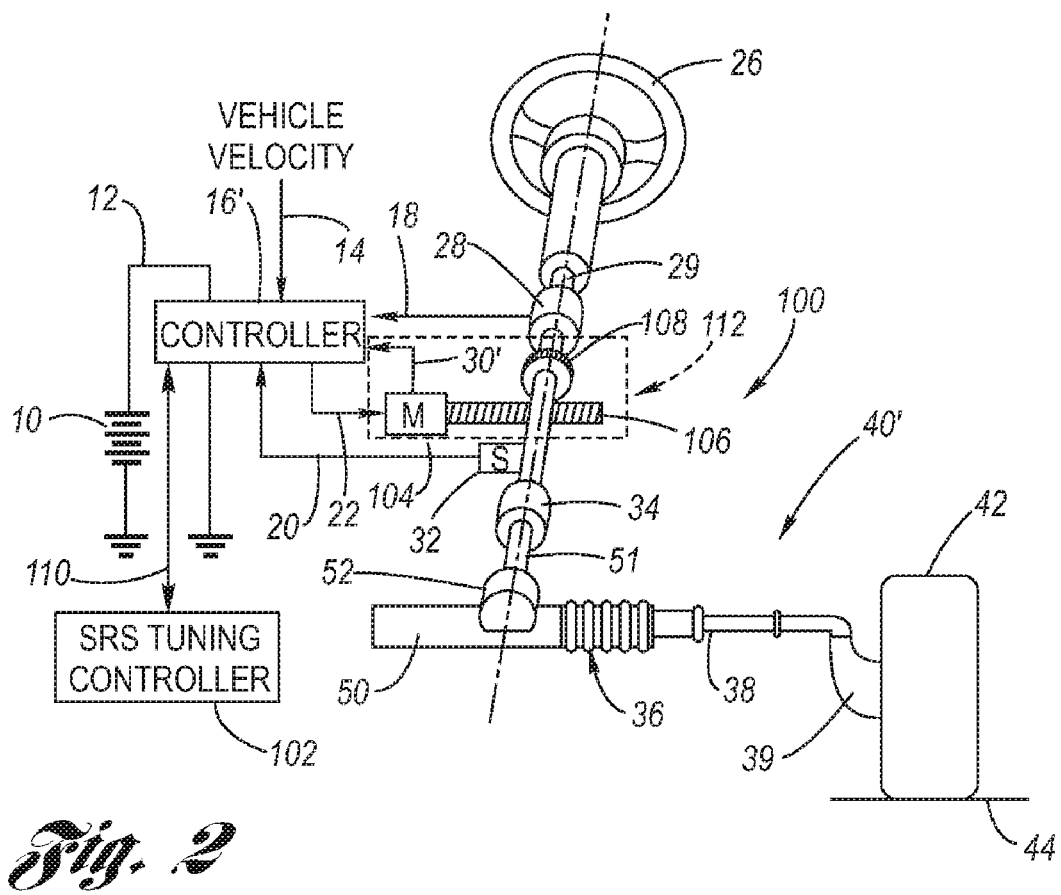
FIG. 2 is an example of an electric power steering system, including a dynamic tuned vibration absorber (TVA), adapted to operate according to the smooth road shake (SRS) attenuation method according to the present invention.

FIG. 2 depicts an example of a CEPS system adapted to operate according to the SRS attenuation method according to the present invention. A motor vehicle 40' is provided with an electric power steering system 100. The electric power steering system 100 may comprise a conventional rack and pinion steering mechanism 36, which includes a toothed rack (not shown) and a column pinion gear (not shown) under gear housing 52. As the steering wheel 26 is turned, an upper steering shaft 29 turns a lower shaft 51 through a joint 34; and the lower steering shaft 51 turns the column pinion gear. Rotation of the column pinion gear moves the rack, which moves tie rods 38 (only one shown), which move steering knuckles 39 (only one shown) to turn tires 42 (only one shown).

The electric power assist is provided through a controller 16' and a power assist actuator comprising an electric motor drive 104. The controller 16' receives electric power from a vehicle electric power source 10 through a line 12, a signal representative of the vehicle velocity on line 14 and column pinion gear angle from a column rotational position sensor 32 on line 20. As the steering wheel 26 is turned, a torque sensor 28 senses the torque applied to steering wheel 26 by the vehicle operator and provides an operator torque signal to controller 16' on line 18.

In response to an SRS tuning controller 102, the vehicle velocity, operator torque, column pinion gear angle, and rotor position signals received, and in conjunction with the SRS tuning controller, the controller 16' derives desired electric motor currents and provides such currents through a bus 22' to the electric motor drive 104, which supplies torque assist to steering shaft 29 through worm gear 106 and motor pinion gear 108. The SRS tuning controller 102 receives electric power (not shown) from the vehicle electric power source 10 and bi-directionally communicates with controller 16' via line 110. The dynamic tuned vibration absorber (TVA) 112 consists of the EPS motor drive 104, worm gear 106, and motor pinion gear 108, composed of the existing EPS motor inertia supported on the torsional stiffness of the column pinion gearing, connecting shafts and couplings to the rack in this CEPS system, or of the column pinion gearing, connecting shafts and rotary couplings in the case of an REPS system, being collectively referred to as the EPS motor assembly.

Figure 3A:
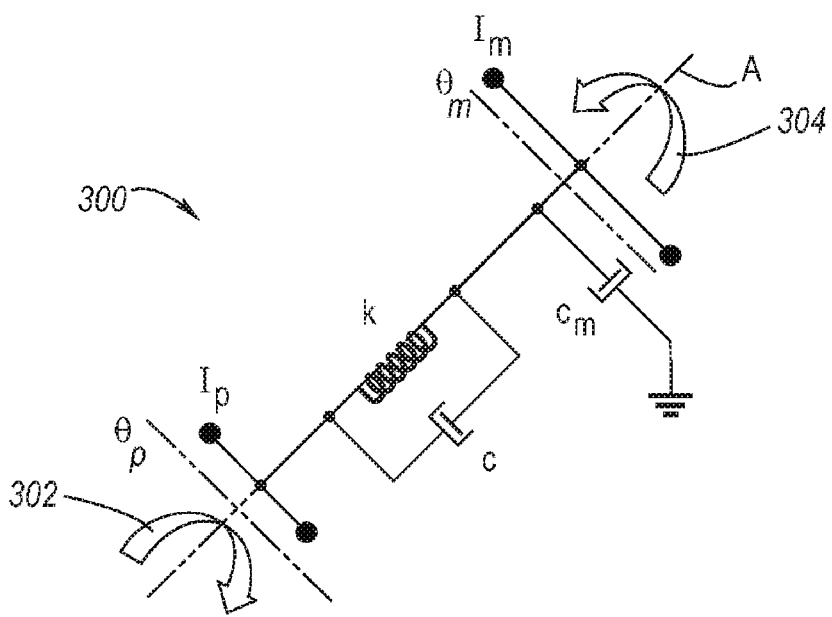
FIG. 3A is a schematic representation of the effective, simplified dynamics of a dynamic tuned TVA, as for example shown at FIG. 2, according to the method of the present invention.
Figure 3B:
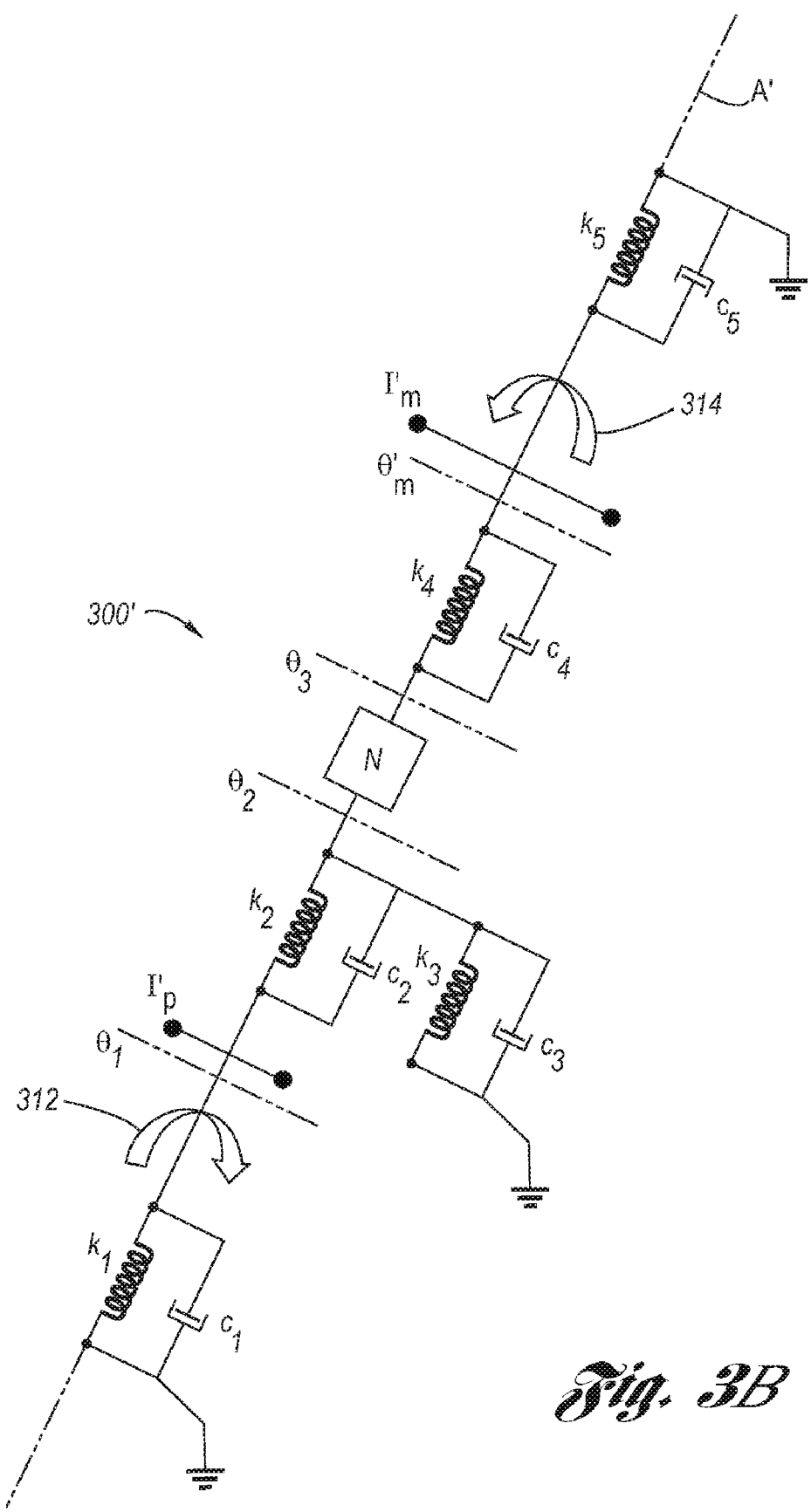
FIG. 3B is a schematic representation, including consideration of the gearing and distributed torsional compliance, of the effective dynamics of a dynamic tuned TVA of FIG. 3A according to the method of the present invention.

FIG. 3A is a schematic representation 300 of the effective, simplified dynamics of a dynamic tuned vibration absorber (TVA), as for example TVA 112, according to the method of the present invention. Ordinarily skilled practitioners will recognize the need for consideration of the gearing and distributed torsional compliance, with the concomitant need to include these features into a comprehensive conceptual model and more complicated schematic representation 300', as shown in FIG. 3B. The ordinarily skilled practitioner will also recognize that even though the more comprehensive schematic 300' of FIG. 3B displays predetermined linear damping elements $c_1$ through $c_5$, any or all damping elements $c_1$ through $c_5$ can be coulomb friction and stiction elements owing to the very nature of the damping origins in a particular mechanization.

FIG. 3B is a schematic representation 300', including consideration of the gearing and distributed torsional compliance, of the effective dynamics of a dynamic tuned vibration absorber (TVA), for example TVA 112 of FIG. 3A, according to the method of the present invention. FIG. 3B depicts the inertia, $I'_m$, of the EPS motor rotor including gearing with gear ratio N within the EPS motor drive 104, effective torsional stiffnesses, $k_1$ through $k_5$, at connecting shafts and bearing supports, inertia, $I'_p$, of motor pinion gear, effective damping coefficients, $c_1$ through $c_5$, due to EPS motor rotor bearing support and shaft couplings between EPS motor rotor and motor pinion gear 108, and angular motion variables $\theta_1$, $\theta_2$, $\theta_3$, and $\theta'_m$ which represent angular displacements. Rotation of EPS motor rotor, shaft of gear 106, and motor pinion gear 108 about axis A' may be clockwise or counter clockwise. Torque 314 applied by the EPS motor and the torque 312 of the connecting link at the pinion are also shown. Both of these torques can exist in two directions, hence, referred to as bi-polar torques. For a particular vehicle model, $I'_m$, $I'_p$, $k_1$ through $k_5$, $c_1$ through $c_5$ and $\theta_1$, $\theta_2$, $\theta_3$, and $\theta'_m$ are concurrently empirically determined, predetermined, or calculated, by techniques well known in the art, such that TVA 112 is tuned to be mechanically resonant at a predetermined SRS frequency, for example 15 Hz.

Furthermore, under dynamic angular motions that are extremely small, elements such as bushings and bearings oftentimes react with piece-wise torsional elasticity and must be so comprehended in the overall performance through effective stiffnesses $k_1$ through $k_5$ in conjunction with linear damping elements $c_1$ through $c_5$. Likewise, couplings and gears may exhibit lash-like properties (not shown) further complicating the dynamic responses. However, with due respect for all of these complications, and without any loss of specificity or generality, and for purposes of illustrating simplified representations of the essential dynamics and advantageous actions thereof, FIG. 3A involves effective inertias and effective connection impedances.

Accordingly, FIG. 3A shows a model with equivalent ideal linear representations, as is typically depicted in the art, of the effective inertia, $I_m$, of the EPS motor rotor including gearing (not shown) within the EPS motor drive 104, effective torsional stiffness, k, of shaft of worm gear 106, inertia, $I_p$, of motor pinion gear effective damping coefficient, $c_m$, due to EPS motor rotor bearing support and effective damping coefficient, c, of shaft couplings of worm gear 106 between EPS motor rotor and motor pinion gear 108. Rotation of EPS motor rotor, shaft of worm gear 106, and motor pinion gear 108 about axis A may be clockwise or counter clockwise. For a particular vehicle model, $I_m$, $I_p$, k, $\theta_p$, and $\theta_m$ and are concurrently empirically determined, predetermined, or calculated, by techniques well known in the art, while damping coefficients c and $c_m$ are empirically determined such that TVA 112 is tuned to be mechanically resonant at a predetermined SRS frequency, for example 15 Hz.

The equation of motion of TVA 112 of FIG. 2 in the Laplace transform domain (s=Laplace variable) with simplified 1$^{st}$ order controller response representations, a practice well known to the skilled practitioner, is given as:

$$\frac{\gamma_{ic}\theta_m s^2}{\tau_{ic}s+1} + \frac{\gamma_{dc}\theta_m s}{\tau_{dc}s+1} + I_m\theta_m s^2 + (k+cs)(\theta_m - \theta_p) + c_m\theta_m s = 0 \quad (1)$$

where c, c, and k have been previously defined. $\theta_m$, and $\theta_p$ are the angular motion variables and represent the angular displacement of the EPS motor rotor and motor pinion gear, respectively, about the shaft of worm gear 106. $\gamma_{ic}$ and $\gamma_{dc}$ represent inertial and damping compensation gains, respectively, to determine the necessary amount of torque for "inertia compensation" and "damping compensation" at a given SRS frequency. Values for $\gamma_{ic}$ are calculated for each SRS frequency and vehicle model and placed in a first look-up table while values for $\gamma_{dc}$ are empirically determined for each SRS frequency and vehicle model and placed in a second look-up table. The first and second look-up tables, preferably, reside within SRS tuning controller 102. $\tau_{ic}$ and $\tau_{dc}$ represent time lags associated with the corresponding applications of the inertial and damping compensations, respectively, and are empirically determined.

In either the REPS system or the CEPS system, the rotating rack impedance, RS, can be expressed through Laplace transformation as:

$$RS = (k+cs)\left(1 - \frac{\theta_m}{\theta_p}\right) \text{ where } \frac{\theta_m}{\theta_p} \quad (2)$$

is obtained from solving equation (1) for $$\frac{\theta_m}{\theta_p}.$$

In either case, ideally, and practically unachievable, but nonetheless described for reason of conveyance of concept, a magnitude of infinity for rack stiffness, either rotational or translational, at a given SRS frequency, implies zero linear displacement of the rack by which steering wheel vibratory activity is zero at this frequency, whereupon the driver is unaware of any SRS. Although unachievable with practical mechanizations and controller characteristics, the tendency to achieve performance closer to this ideal abstraction, rather than departing from this condition with non-frequency selective dynamic stiffening, for example, results in improved SRS performance.

Figure 4:
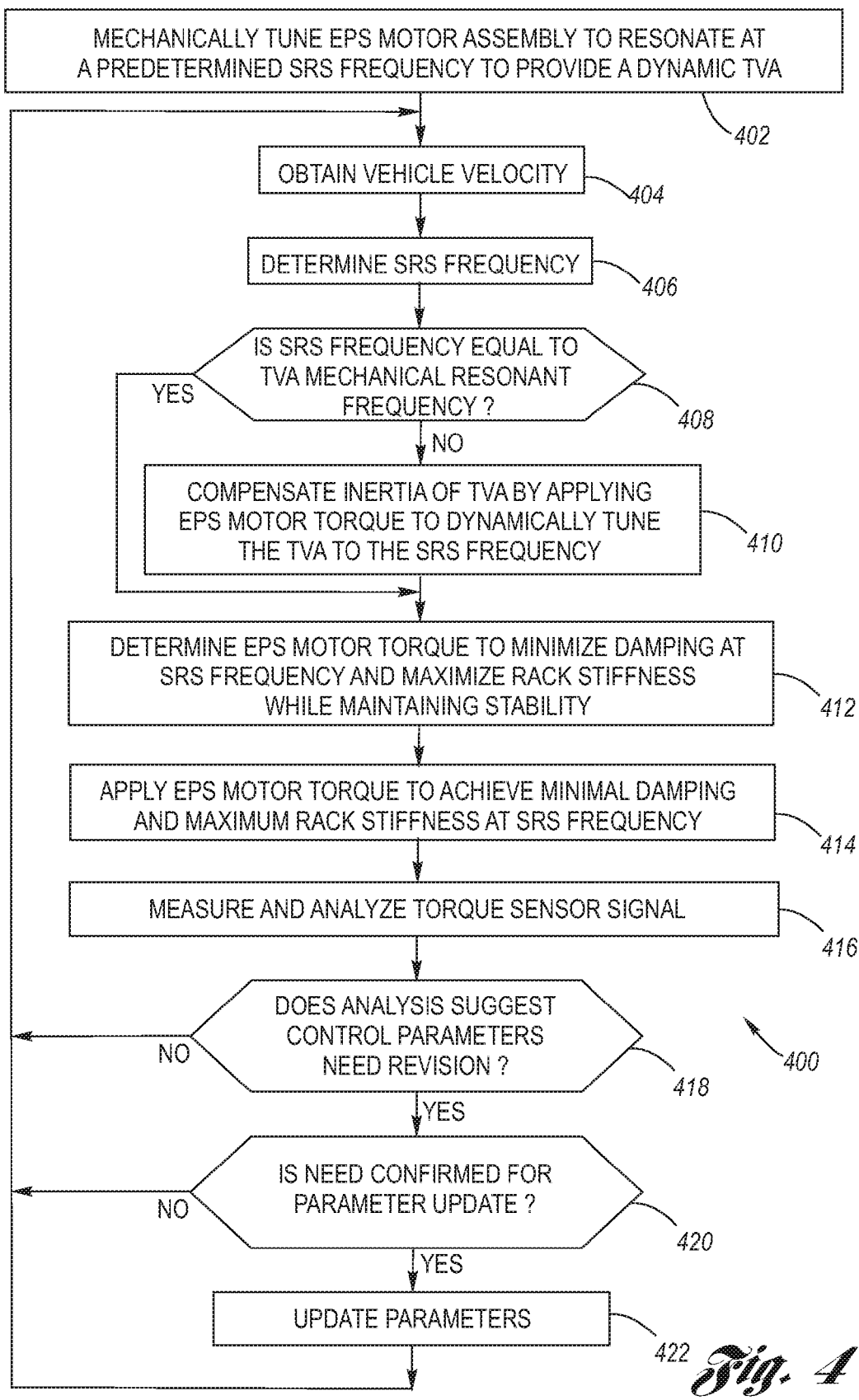
FIG. 4 is an algorithm for exemplar implementation of the SRS attenuation method according to the present invention.

In concert with the foregoing description, the SRS attenuation method according to the present invention consists of the following steps, to be further specified with respect to FIG. 4:

1. Mechanically tuning an EPS motor assembly, by techniques known in the art, to resonate at a predetermined SRS frequency, for example a mid-range SRS frequency, as for example 15 Hz, to provide a mechanically tuned dynamic tuned vibration absorber, TVA, for example TVA 112 of FIG. 2.

2. Dynamically tuning the TVA, for example TVA 112 of FIG. 2, if necessary, to the SRS frequency determined from at least one of the vehicle velocity and periodic dynamic content measured in the EPS torque sensor, utilizing "inertia-compensation", via controlling current to the EPS motor.

3. Minimize the damping of the TVA utilizing "damping compensation" at the determined SRS frequency, by controlling current to the EPS motor that offsets the combination of pre-existing mechanical damping characteristics and controller damping compensation as a consequence of the time lagged inertia compensation used for the majority of the combined mechanical and electronically augmented TVA frequency shifts so as to maximize the rack stiffness (rotary or translational) at the SRS frequency, while maintaining vibrational stability and other desirable dynamics of the TVA and thereby minimize steering wheel shake at the SRS frequency whereby the driver is least aware of the SRS.

To further illustrate the approach and to simplify conceptual conveyance of the method of the present invention without any loss in specificity or generality, the time lag terms $\tau_{ic}$ and $\tau_{dc}$ in equation (1) can be eliminated and $I_p$ may be set to zero in FIG. 3, thereby elucidating the dynamics resulting in an adjusted rotary rack stiffness transfer function in the Laplace domain, given as:

$$\frac{T_p}{\Theta_p} = \frac{\begin{array}{c} c_m ks + k\gamma_{dc}s + I_m cs^3 + I_m ks^2 + cc_m s^2 + c\gamma_{dc}s^2 + \\ c\gamma_{ic}s^3 + k\gamma_{ic}s^2 \end{array}}{k + I_m s^2 + \gamma_{ic}s^2 + cs + c_m s + \gamma_{dc}s} \quad (3)$$

where $T_p$ is the torque applied at the motor pinion gear 108 and $\Theta_p$ represents the angular displacement of the motor pinion gear about the shaft of worm gear 106.

In order for the magnitude of equation (3) to be, ideally, infinite requires that the magnitude of the denominator of equation (3) be zero. The terms in the denominator of equation (3) may be separated into two groups: the first group consisting of the three terms $[k+I_m s^2 + \gamma_{ic}s^2]$, the second group consisting of the three terms $[cs+c_m s+\gamma_{dc}s]$.

For a given SRS frequency, the terms of the first group are real and the $s^2$ terms are representative of the mechanical angular acceleration of the EPS motor rotor and the angular acceleration-responsive contribution of the EPS controller determined from the differentiation of the EPS motor rotor position signals and the gain of the controller. The amount of EPS motor torque required for "inertia compensation" to dynamically tune the TVA to the SRS frequency determined from the vehicle velocity can be determined from the angular acceleration and parameters k, $I_m$, and $\gamma_{ic}$ by setting the terms of the first group equal to zero. To dynamically lower the SRS frequency, the amount of EPS motor torque determined for "inertia compensation" is added to the mechanical inertia effects applied by the rack to increase the resultant effective inertia. To dynamically raise the SRS frequency, the amount of EPS motor torque determined for "inertia compensation" is subtracted from the mechanical inertia effects applied by the rack to decrease the resultant effective inertia. This is implemented as current to the EPS motor provided by the controller 16' in conjunction with the SRS tuning controller 102.

For a given SRS frequency, the terms of the second group are imaginary and the 's' terms are responsive to the angular velocity of the EPS motor rotor determined from the EPS motor rotor position signals. The angular velocity of the EPS motor rotor produces damping of the TVA through mechanical actions and the amount of EPS motor torque required for ideal "damping compensation" (i.e., zero damping or infinite rotary rack stiffness) can be determined from the angular velocity and parameters c, $c_m$, and $\gamma_{dc}$ by setting the terms of the second group equal to zero. This is implemented as current to the EPS motor provided by the controller 16' in conjunction with the SRS tuning controller 102 that offsets the combination of pre-existing mechanical damping characteristics and controller damping compensation as a consequence of the time lagged inertia compensation used for the majority of the combined mechanical and electronically augmented TVA frequency shifts. Practically, however, there is a minimum damping limit or maximum rotary rack stiffness, empirically determined for each vehicle model, such that, for example, the TVA becomes vibrationally unstable if damping is reduced below this minimum damping limit. The dynamic torque sensor signal, near a given SRS frequency, may be monitored to determine whether minimum damping has been achieved.

FIG. 4 is an algorithm 400 for implementing, by way of example with reference to FIG. 2, the SRS attenuation method according to the present invention.

At Block 402, TVA 112 is tuned to be mechanically resonant at a predetermined SRS frequency, preferably the mid-range frequency of the SRS, for example 15 Hz, as previously described. After which, the vehicle velocity is obtained at Block 404 and the SRS frequency is estimated from at least one of the vehicle velocity and the periodic dynamic content measured in the torque sensor at Block 406. At Block 408, if the SRS frequency of Block 406 is equal to the mechanical resonant frequency of TVA 112, control passes to Block 412. Otherwise, control passes to Block 410.

At Block 410, the EPS motor rotor position signals can be utilized to obtain the EPS motor rotor angular velocity and angular acceleration by which the necessary EPS motor torque can be calculated to dynamically tune the TVA to the SRS frequency determined at Block 406 as previously described, wherein current to the EPS motor provided by the controller 16' in conjunction with the SRS tuning controller 102 effects the dynamic frequency tuning of the TVA to the SRS frequency, wherein this dynamic tuning may result in a time lagged inertia of the TVA. In this regard, if the SRS frequency of Block 406 is greater than the mechanical resonant frequency of TVA 112, then the equivalent inertia at the SRS frequency is decreased from its inertia at the mechanical resonant frequency by the time lagged inertia of the TVA and the equivalent damping at the SRS frequency is decreased from its damping at the mechanical resonant frequency by the inherent damping due to the time lag associated with the time lagged inertia of the TVA; whereas, if the SRS frequency of Block 406 is less than the mechanical resonant frequency of TVA 112, then the equivalent inertia at the SRS frequency is increased from its inertia at the mechanical resonant frequency by the time lagged inertia of the TVA and the equivalent damping at the SRS frequency is increased from its damping at the mechanical resonant frequency by the inherent damping due to the time lag associated with the time lagged inertia of the TVA.

At Block 412, EPS motor torque is determined to minimize damping and maximize rotary rack stiffness while maintaining vibrational stability of the TVA for the SRS frequency determined at Block 406 as previously described. After which, control passes to Block 414.

At Block 414, the EPS motor torque determined at Block 412 is applied to the TVA (i.e., the EPS motor assembly) to achieve minimal damping and maximum rotary rack stiffness at the SRS frequency determined at Block 406, wherein current to the EPS motor provided by the controller 16' in conjunction with the SRS tuning controller 102 effects the minimization of damping at the SRS frequency that offsets the combination of pre-existing mechanical damping characteristics and controller damping compensation as a consequence of the time lagged inertia compensation used for the majority of the combined mechanical and electronically augmented TVA frequency shifts. Control then passes to Block 416 whereat the torque sensor signal is measured and analyzed. After which, control passes to Block 418.

At Block 418, if the analysis of the torque sensor signal at Block 416 indicates adequate compatibility (see below) between the dynamics and the compensation and no updates to compensation properties or tables are warranted (see below), then control passes to Block 404, whereat the algorithm 400, except for Block 402, begins anew. Otherwise, control passes to Block 420.

At Block 420, if a sufficient number of analyses have occurred in which performance metrics exceed predetermined limits, indicating departures from expected performance such that there is need, based upon predetermined considerations (see below), to update parameters for compensation properties or tables, control passes to Block 422. In this regard, departures from expected performance indicating a need to update parameters for compensation properties or tables include, as non-limiting examples: differences in detected versus expected frequency of the periodic content in the torque sensor signal, apparent damping observable at or near the periodic frequency and the detected versus expected amplitude of the periodic content in the torque signal. These departures, furthermore, can be detected or their presence can be confirmed by altering control parameters and measuring the consequences of the changes in the torque sensor. If the departures are large enough, or a pattern of departures (e.g.: incident rate of departures at isolated speeds) becomes evident, a need to update compensation properties or tables exists.

At Block 422, the parameters for compensation properties and tables are updated. After which, control passes to Block 404, whereat the algorithm 400, except for Block 402, begins anew.

Those ordinarily skilled in the art will recognize the actions taken in Blocks 418, 420 and 422 as adaptive, implying that changes in the control parameters are warranted and implemented for improved dynamic performance. Such revisions in parameters can be aggressive or subdued, depending on the size of the incremental changes implemented at these adaptive Blocks. These adaptive practices are well known to those ordinarily skilled in the art, with the amount of parameter change over time, i.e., their aggressive or subdued nature, determined by the loop times of the process and the fraction of suggested parameter change that is adopted at Block 422.

Figure 6:
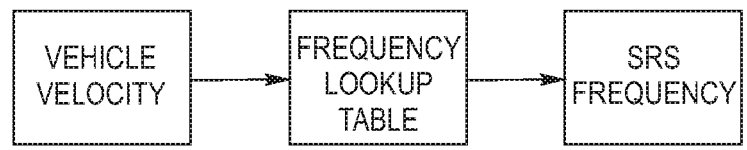
FIG. 6 exemplifies the use of practices in algorithm 400 of FIG. 4 to determine the SRS frequency according to the present invention.
Figure 7:
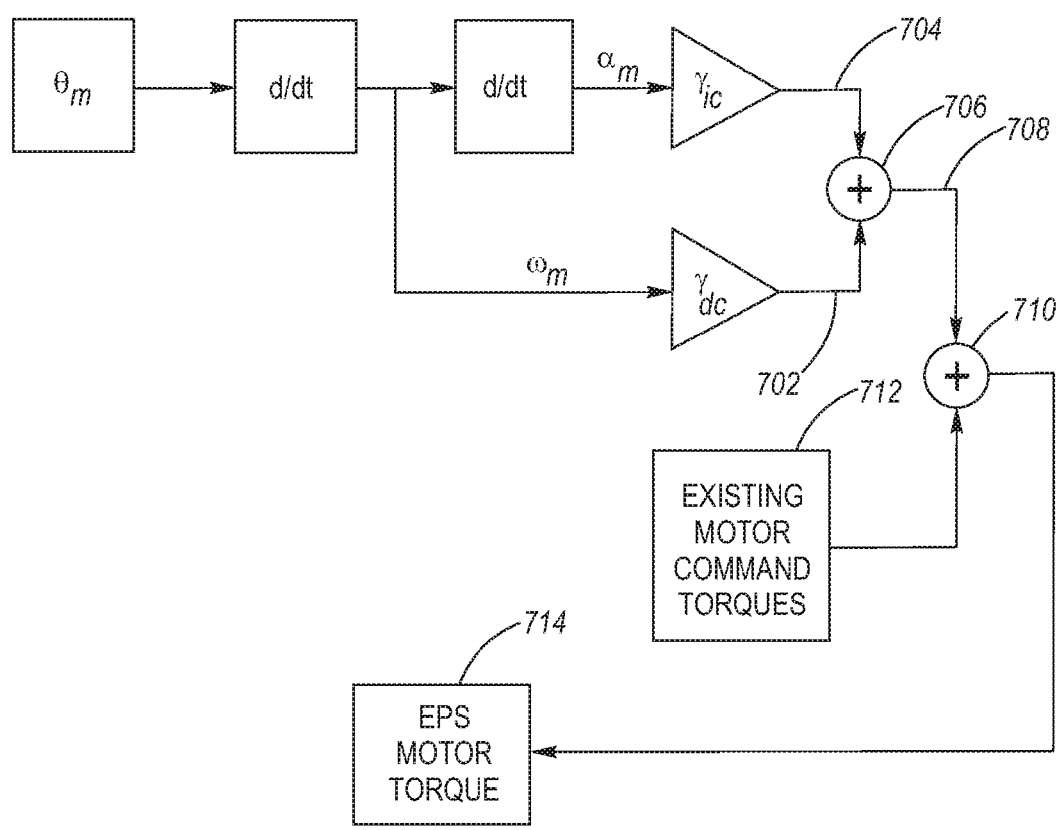
FIG. 7 exemplifies the use of practices in algorithm 400 of FIG. 4 to determine EPS motor torque according to the present invention.
Figure 8:
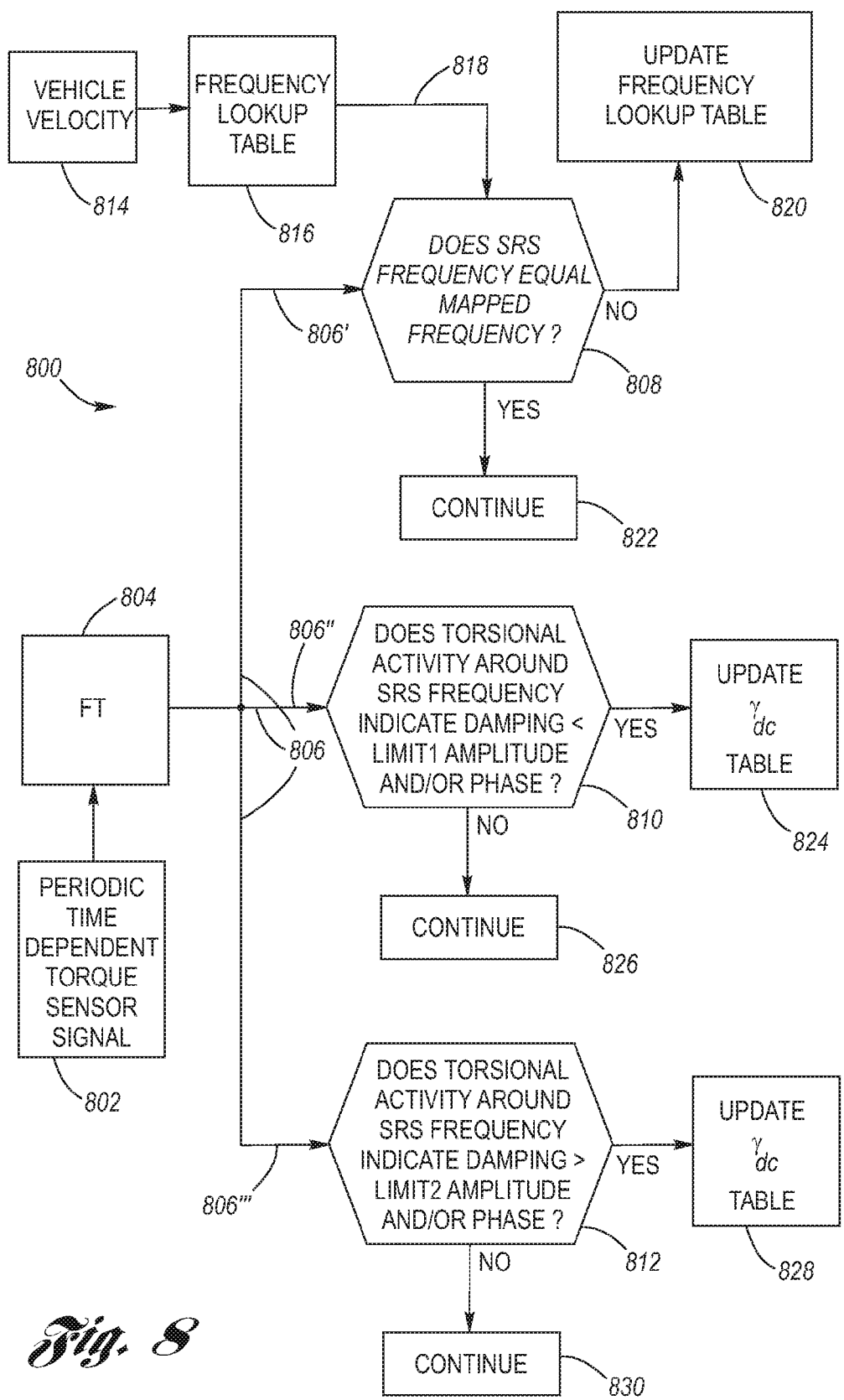
FIG. 8 exemplifies the use of adaptive practices in algorithm 400 of FIG. 4 to update control parameters according to the present invention.

FIGS. 6 and 7 exemplify the use of practices in algorithm 400 of FIG. 4, applicable with or without adaptive practices; FIGS. 8 through 9B exemplify the use of adaptive practices in the algorithm 400.

FIG. 6 shows the use of exemplary practices in algorithm 400 of FIG. 4 to determine the SRS frequency of Block 406 according to the present invention.

FIG. 7 exemplifies the use of practices in algorithm 400 of FIG. 4 to determine EPS motor torque according to the present invention. In FIG. 7, first and second derivatives of measured values of $\theta_m$ are utilized to determine the angular velocity $\omega_m$ and angular acceleration $\alpha_m$, respectively. The angular velocity $\omega_m$ and angular acceleration $\alpha_m$ are multiplied by $\gamma_{dc}$ and $\gamma_{ic}$, respectively, to produce damping compensation torque on line 702 and inertial compensation torque on line 704 which are summed by summer 706 and presented as a first input 708 to summer 710. The values of $\gamma_{dc}$ and $\gamma_{ic}$ can be dynamically updated through adaptive practices, for example, of FIG. 8, to be described later. A second input 712 to summer 710 represents existing motor command torques, for example steering assist, active return to center, road sideslope compensation, etc. The output 714 of summer 710 is the EPS motor torque.

FIG. 8 exemplifies the use of adaptive practices in algorithm 400 of FIG. 4 to update control parameters according to the present invention. FIG. 8 is a schematic depiction 800 of adaptive practices utilized in Blocks 416 through 422 by which predetermined parameters and limits are updated. The time periodic torque sensor signal at Block 802 is Fourier Transformed at Block 804 whereby torsional activity (i.e., spectral amplitude and phase angle) around the torque sensor SRS frequency and the torque sensor SRS frequency are available at the output 806 of Block 804. The output 806 of Block 804 is a first input 806' to Block 808, an input 806" to Block 810, and an input 806''' to Block 812.

The vehicle velocity at Block 814 is input to Block 816 containing the "Frequency Lookup Table" to obtain the mapped SRS frequency 818 which is a second input to Block 808. At Block 808, if the torque sensor SRS frequency from first input 806' does not equal the mapped frequency 818 to within a predetermined limit, the "Frequency Lookup Table" is updated at Block 820. Tire wear, tire inflation variations, and new tires are some examples whereby a change in the "Frequency Lookup Table" may occur which necessitates updates to the "Frequency Lookup Table". Otherwise, algorithm 400 continues at Block 822.

Reliance on velocity as an indicator of SRS frequency reduces the computational demand for detection of the actual SRS frequency. Those ordinarily skilled in the art of such practices will also recognize the method of reliance on the periodic content of the detected SRS frequency as an alternative. When vehicle velocity is used for at least the reason previously cited, the need for interpolated and extrapolated estimates of frequency will arise. These interpolations and extrapolations can be achieved with the use of any number of mathematical forms for the dependency of SRS frequency on the vehicle velocity for the functional interrelationship. Examples of mathematical forms include linear, piece-wise linear, square-law, cubic and polynomial dependencies of SRS frequency on vehicle velocity, primarily determined by the characteristics of the tire properties, evidenced in the detected interrelationship. SRS frequencies can also be estimated by the combination of vehicle velocity and periodic content of the measured dynamic torque in a manner whereby vehicle velocity is disproportionately used and the measured periodic content of the torque signal is only occasionally detected for confirmatory purposes with a regularity, for example, of minutes, hours, days or equivalent incremental mileage. This is a preferred method of implementation and is a method included in FIG. 8.

At Block 810, if the torsional activity (i.e., spectral amplitude and phase angle) from input 806" around the torque sensor SRS frequency indicates that damping is less than a predetermined Level1, the $\gamma_{dc}$ table is updated at Block 824. Otherwise, algorithm 400 continues at Block 826.

At Block 812, if the torsional activity (i.e., spectral amplitude and phase angle) from input 806' around the torque sensor SRS frequency indicates that damping is greater than a predetermined Level2, the $\gamma_{dc}$ table is updated at Block 828. Otherwise, algorithm 400 continues at Block 830.

Figure 9A:
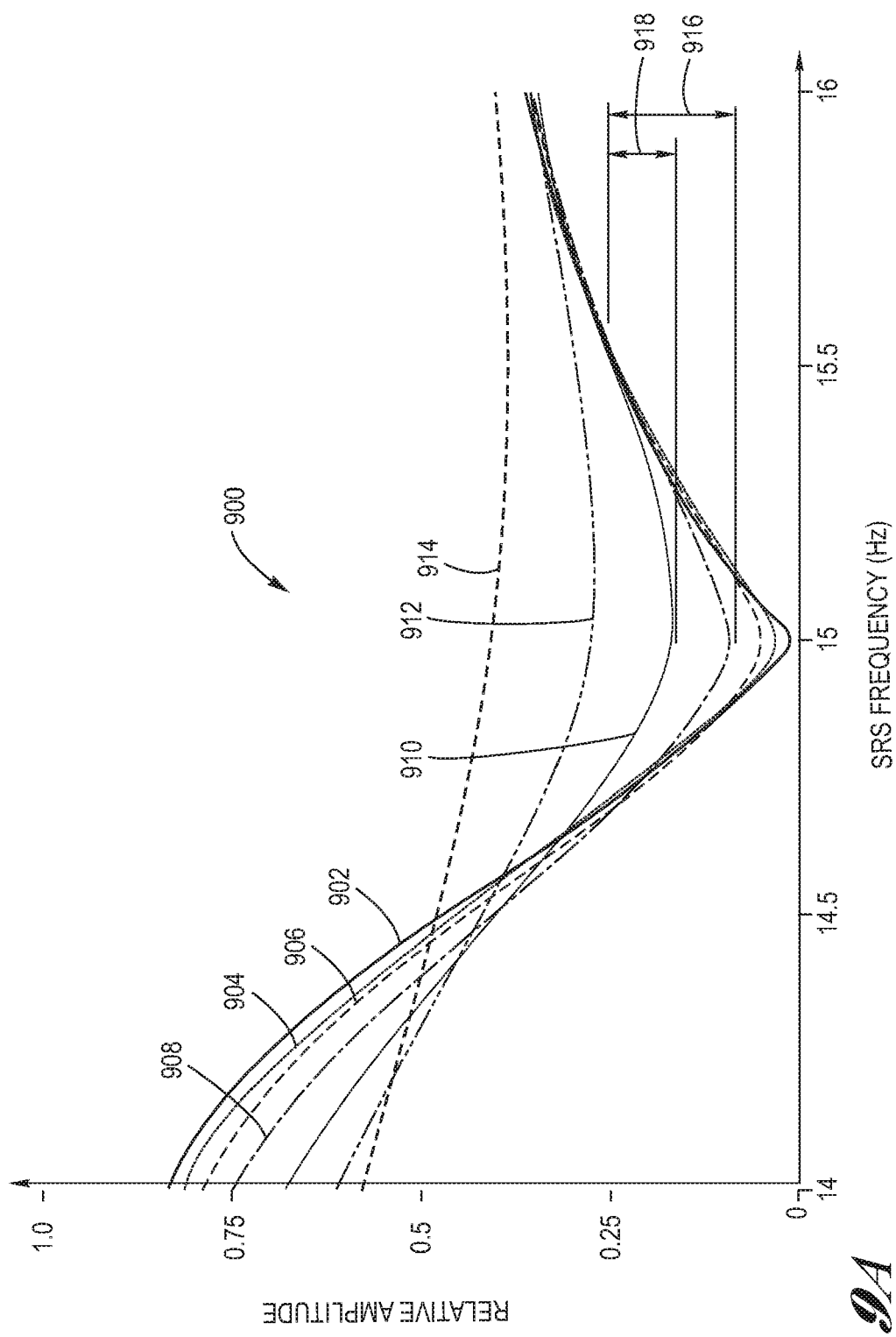
FIG. 9A is a first plot exemplifying first and second predetermined amplitude limits utilized in FIG. 8 according to the present invention.
Figure 9B:
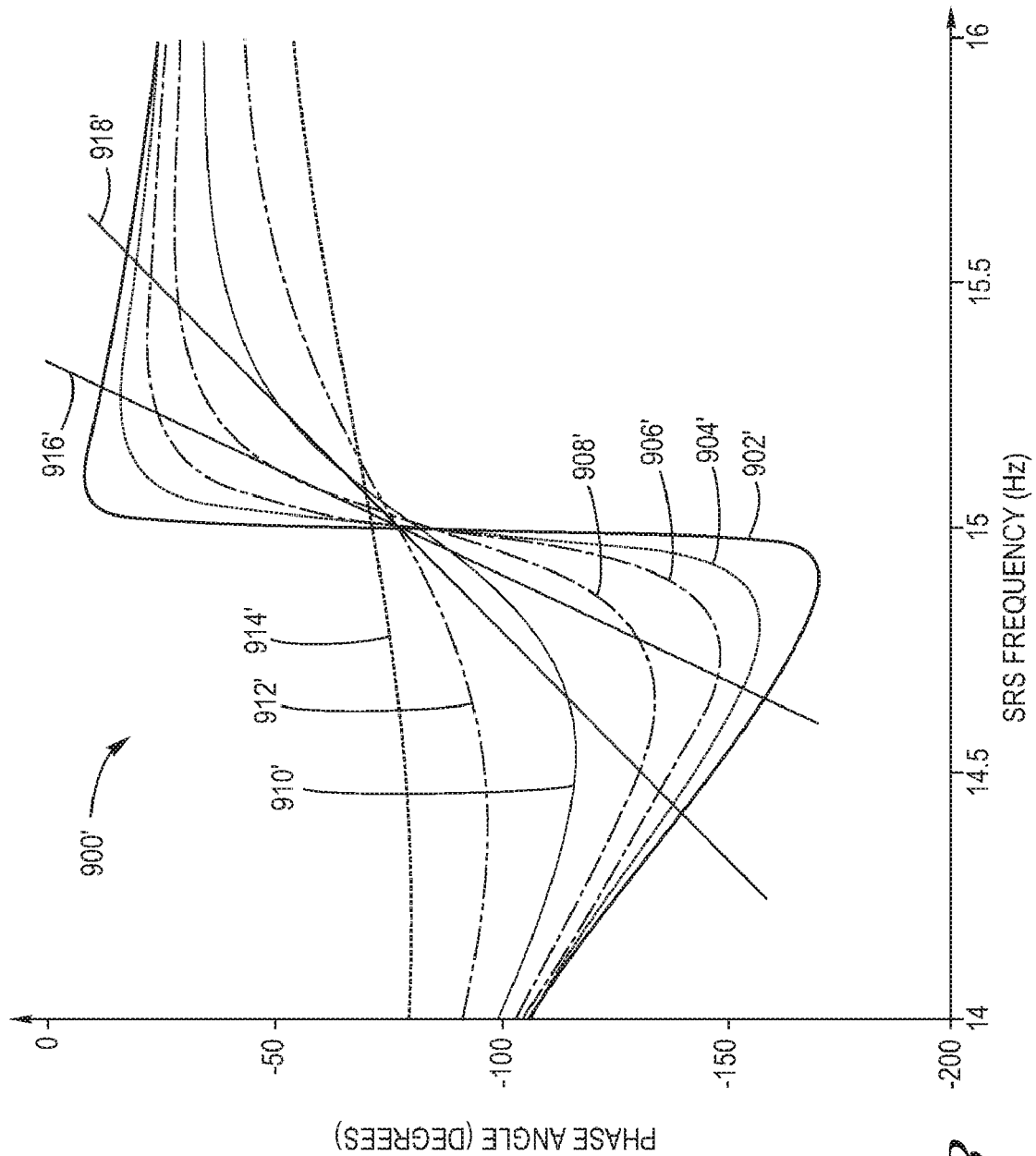
FIG. 9B is a second plot exemplifying first and second predetermined phase angle limits utilized in FIG. 8 according to the present invention.

FIG. 9A is a first plot 900 exemplifying first and second predetermined amplitude limits utilized in FIG. 8 according to the present invention, using a SRS frequency of 15 Hz as an example. Graphs 902 through 914 represent spectral amplitude versus frequency plots within a predetermined spectral band about the SRS frequency, available at the output 806 of Block 804, having damping coefficients of 0.05, 0.25, 0.50, 1.00, 4.00, and 8.00 percent, respectively. The ratio of amplitudes at predetermined frequencies within the predetermined spectral band about the SRS frequency having a given damping coefficient is indicative of the amount of damping present near the SRS frequency, wherein the larger the ratio, the greater the damping and may be used to specify limits for low damping and high damping. For example, the ratio of amplitudes at 15 Hz and 15½ Hz for a given damping coefficient may be used to specify the low damping limit, Limit1 916, utilized at Block 810 of FIG. 8 or specify the high damping limit, Limit2 918, utilized at Block 812 of FIG. 8.

FIG. 9B is a second plot 900' exemplifying first and second predetermined phase angle limits utilized in FIG. 8 according to the present invention, using a SRS frequency of 15 Hz as an example. Graphs 902' through 914' represent phase angle versus frequency plots within a predetermined spectral band about the SRS frequency, available at the output 806 of Block 804, having damping coefficients of 0.05, 0.25, 0.50, 1.00, 4.00, and 8.00 percent, respectively. The ratio of phase angle slopes at the SRS frequency within the predetermined spectral band about the SRS frequency having different damping coefficients is indicative of the amount of damping present at the SRS frequency, wherein the larger the ratio, the lower the damping and may be used to specify limits for low damping and high damping. For example, the ratio of slopes at 15 Hz for damping coefficients 1.00 and 4.00 may be used to specify the low damping limit, Limit1 916', utilized at Block 810 of FIG. 8 or specify the high damping limit, Limit2 918', utilized at Block 812 of FIG. 8.

Since $\gamma_{dc}$ and $\gamma_{ic}$ can be functions of velocity, the aforesaid practices of creating, retaining and updating tables of these values comprise multiple values throughout the velocity range, such that operation of the vehicle at or nearby a vehicle velocity entry identifies values that are appropriate for that velocity. The applicable ranges of velocities and the number of table entries are predetermined, for example, by the nominal damping and inertia compensation values, desired SRS effectiveness, computational demand and velocity resolution.

Figure 5:
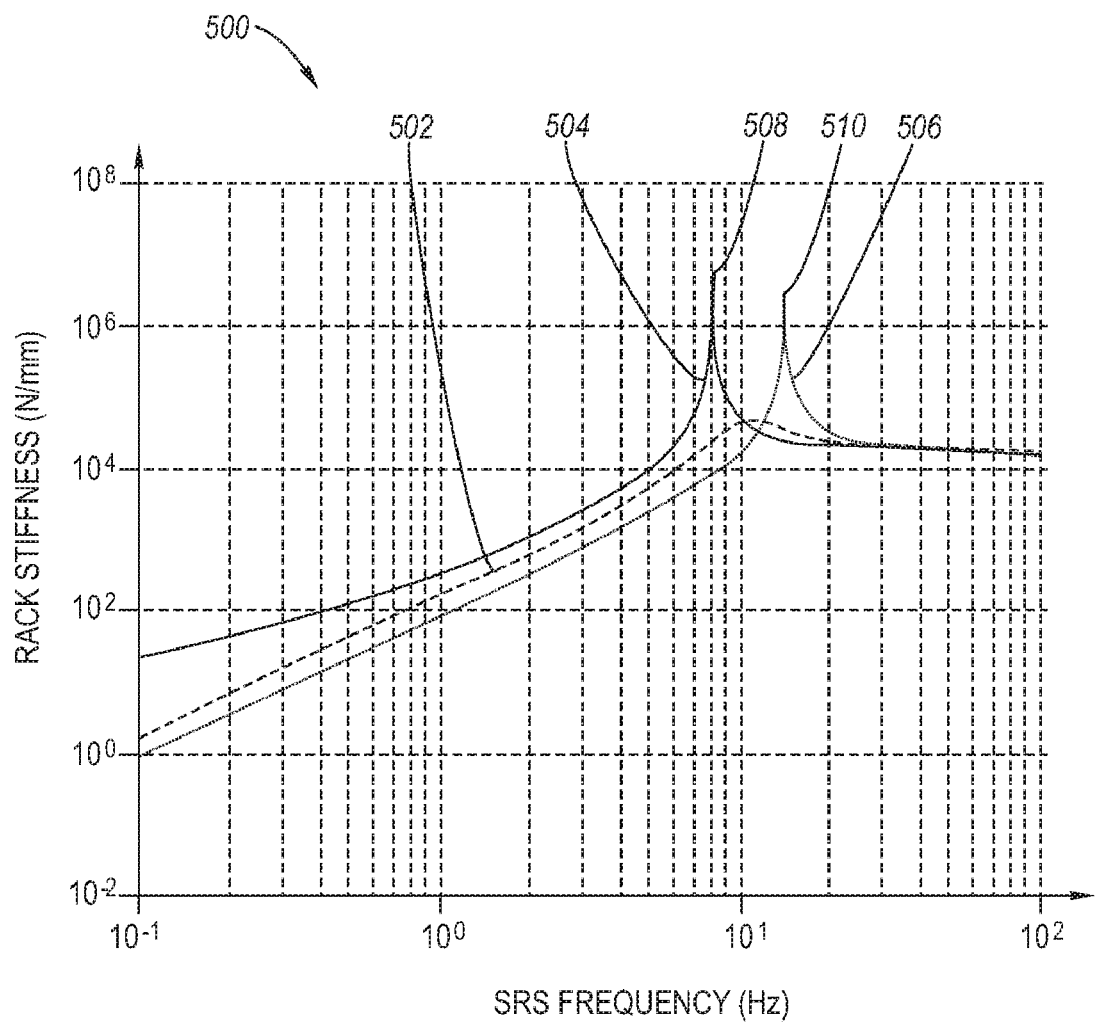
FIG. 5 is a graph of reverse-driven translational rack stiffness versus frequency, indicating plots of translational rack stiffness for a steering assembly not using the present invention and for a steering assembly using the present invention, showing center amplified frequency peaks for SRS attenuation.

FIG. 5 is a graph 500 of translational rack stiffness versus SRS frequency and indicates plots of translational rack stiffness for a steering assembly not using the present invention, plot 502, having an SRS center frequency of, approximately, 10 Hz, and for a steering assembly using the present invention, plots 504 and 506, showing SRS center frequencies of attenuation of, approximately, 8 Hz and 15 Hz, 508 and 510, respectively. The center frequencies of attenuation, 508 and 510, are indicative of large or maximum rotary rack stiffness or small or minimum damping, at the respective SRS frequencies of, approximately, 8 Hz and 15 Hz, according to the method of the present invention, thereby minimizing steering wheel shake (i.e., small angular back and forth vibrations) at the respective SRS frequencies of, approximately, 8 Hz and 15 Hz, whereupon the driver is least aware of the SRS. The absence of a sharp peak at 10 Hz of plot 502 is indicative of non-minimal damping or non-maximum rotary rack stiffness whereby, at the SRS frequency of 10 Hz, steering wheel vibratory activity would not be minimized whereupon the driver would be much more aware of the SRS than utilizing the present invention.

Effective SRS attenuation over various speeds is thereby achieved by manipulating the center frequency of the peak rotary rack stiffness in the vicinity of the periodic excitation such that there is virtual alignment of these frequencies as the speed fluctuates in use, by either estimating the relationship of the periodic frequency as a function of speed through the rolling properties of the tire and/or detecting the periodic frequency in the torque sensor of the EPS. This alignment of frequencies is obtained by changing the apparent resonant frequency of the TVA so that it is at or near that of the periodic SRS excitation frequency with the practices explained in the preceding.

It should also be noted that the inertia and damping compensation can be optionally frequency band limited such that desirable effects as cited in the preceding are achieved only near the periodic excitation frequencies. This is possible with filtered, band-limiting implementations operative on either the detected accelerations and velocities or the output control signals ultimately determining the motor drive. Additional advantages by avoiding conditions such as vibratory instability at elevated frequencies (in excess of the low pass corner frequency of the passband) and interference effects on forward-driven properties at lower frequencies (existing below the high pass corner frequency of the passband), typical of steering events, could be enjoyed through these band-limited implementations. Filter implementations are well known to those skilled in the art and may be practiced for, at least, the aforesaid purpose.

Table I utilizes a TVA tuned to be mechanically resonant at 15 Hz and represents, merely by way of instructive hypothetical, non-limiting examples, indication of values provided in the course of execution of the algorithm 400 of FIG. 4, according to the present invention. Such systems are applicable to both CEPS and REPS.

TABLE I

| Parameter | Units | SRS Frequency (Hz) | | |
|---|---|---|---|---|
| | | 10 | 15 | 20 |
| $I'_m$ | kg·m$^2$ | 250 × 10$^{-6}$ | 250 × 10$^{-6}$ | 250 × 10$^{-6}$ |
| $k_2$ | Nm/deg | 18.6 | 18.6 | 18.6 |
| $c_2$ | Nm-s/deg | 0.0103 | 0.0103 | 0.0103 |
| $k_4$ | Nm/deg | 34.9 | 34.9 | 34.9 |
| $c_4$ | Nm-s/deg | 0.0194 | 0.0194 | 0.0194 |
| $k_1$_$k_3$_$k_5$ | Nm/deg | 0 | 0 | 0 |
| $c_1$_$c_5$ | Nm-s/deg | 3.49 × 10$^{-4}$ | 3.49 × 10$^{-4}$ | 3.49 × 10$^{-4}$ |
| $c_3$ | Nm-s/deg | 3.49 × 10$^{-3}$ | 3.49 × 10$^{-3}$ | 3.49 × 10$^{-3}$ |
| $I'_p$ | kg·m$^2$ | 0 | 0 | 0 |
| $r_p$ | M | 0.007 | 0.007 | 0.007 |
| N | — | 20 | 20 | 20 |
| $\gamma_{dc}$ | — | −3.6 × 10$^{-4}$ | −3.6 × 10$^{-4}$ | −3.0 × 10$^{-4}$ |
| $\gamma_{ic}$ | — | 365 × 10$^{-6}$ | 0 | −135 × 10$^{-6}$ |
| $\tau_{ic}$ | Sec | 0.003 | 0.003 | 0.003 |
| $\tau_{dc}$ | Sec | 0.003 | 0.003 | 0.003 |
| Nominal prior art Rotary Rack Stiffness | Nm/deg | 12.2 | 23.5 | 42.0 |
| Rotary Rack Stiffness according to present invention | Nm/deg | 122 | 180 | 317 |

To those skilled in the art to which this invention appertains, the above described preferred embodiment may be subject to change or modification. Such change or modification can be carried out without departing from the scope of the invention, which is intended to be limited only by the scope of the appended claims.

The invention claimed is:

1. A method for attenuating smooth road shake at a steering wheel of a steering column of a motor vehicle having an electric power steering system including an electric motor and a rack, comprising the steps of:
   determining a frequency range of the smooth road shake during predetermined driving conditions of the motor vehicle;
   mechanically tuning an electric power steering motor assembly of the motor vehicle electric power steering system to a predetermined frequency to thereby provide a tuned vibration absorber having a mechanically tuned resonance frequency substantially proximate the frequency range of the smooth road shake; and
   damping the tuned vibration absorber to maximize rack stiffness at the frequency range of the smooth road shake so as to thereby minimize smooth road shake at the steering wheel over a range of vehicle speeds.

2. The method of claim 1, further comprising:
   a) determining smooth road shake frequency at an operating velocity of the vehicle;
   b) dynamically tuning the tuned vibration absorber to the frequency of the smooth road shake at the velocity except if the frequency of the smooth road shake is the mechanically tuned resonance frequency; and
   c) minimizing damping of the tuned vibration absorber to maximize rack stiffness at the frequency of the smooth road shake so as to thereby minimize smooth road shake at the steering wheel.

3. The method of claim 2, further comprising periodically repeating said steps a) through c).

4. The method of claim 2, wherein the mechanical tuning of the electric power steering motor assembly is to substantially a mid-range frequency of said frequency range to thereby provide the tuned vibration absorber having a mechanically tuned resonance frequency.

5. The method of claim 2, wherein said steps of b) and c) comprise controlling current in the electric motor of the electric power steering system to provide an equivalent of an inertia of the electric power steering assembly which effects the dynamic tuning of said step b) and to provide a torque which effects the minimized damping of said step c).

6. The method of claim 5, further comprising in said step c), speed-sensitive compensatory damping of the tuned vibration absorber so as to minimize inertial time lag introduced by step b) in providing the equivalent of an inertia of the electric power steering assembly.

7. The method of claim 6, wherein in said step a) the smooth road shake at an operating velocity of the motor vehicle is determined from at least one of: 1) a predetermined relationship between motor vehicle velocity and smooth road shake frequency, and 2) periodic dynamic content of a torque signal of the electric power steering system.

8. The method of claim 7, wherein the mechanical tuning of the electric power steering motor assembly is to substantially a mid-range frequency of said frequency range to thereby provide the tuned vibration absorber having a mechanically tuned resonance frequency.

9. The method of claim 8, further comprising periodically repeating said steps a) through c).

10. The method of claim 7, wherein said steps b) and c) are performed on a electric power steering system having the electric motor thereof drivingly interfaced with the rack.

11. The method of claim 10, wherein the mechanical tuning of the electric power steering motor assembly is to substantially a mid-range frequency of said frequency range to thereby provide the tuned vibration absorber having a mechanically tuned resonance frequency.

12. The method of claim 7, wherein said steps b) and c) are performed on a electric power steering system having the electric motor thereof drivingly interfaced with the steering column.

13. The method of claim 12, wherein the mechanical tuning of the electric power steering motor assembly is to substantially a mid-range frequency of said frequency range to thereby provide the tuned vibration absorber having a mechanically tuned resonance frequency.

14. The method of claim 7, wherein steps a), b) and c) utilize a predetermined plurality of parameters of the motor vehicle, further comprising periodically evaluating the plurality of parameters for divergence exceeding a predetermined range, wherein if the divergence exceeds the predetermined range, then the plurality of parameters are updated responsive to the divergence.

15. The method of claim 14, wherein the mechanical tuning of the electric power steering motor assembly is to substantially a mid-range frequency of said frequency range to thereby provide the tuned vibration absorber having a mechanically tuned resonance frequency.

16. The method of claim 7, wherein steps a), b) and c) are frequency band limited proximate periodic excitation frequencies of the smooth road shake.

17. The method of claim 16, wherein the mechanical tuning of the electric power steering motor assembly is to substantially a mid-range frequency of said frequency range to thereby provide the tuned vibration absorber having a mechanically tuned resonance frequency.

18. A method for attenuating smooth road shake at a steering wheel of a steering column of a motor vehicle having an electric power steering system including an electric motor and a rack, comprising the steps of:
   a) determining a frequency range of the smooth road shake during predetermined driving conditions of the motor vehicle;
   b) mechanically tuning an electric power steering motor assembly of the motor vehicle electric power steering system to a predetermined frequency to thereby provide a tuned vibration absorber having a mechanically tuned resonance frequency;
   c) determining smooth road shake frequency at an operating velocity of the vehicle, determined from at least one of: 1) a predetermined relationship between motor vehicle velocity and smooth road shake frequency, and 2) periodic dynamic content of a torque signal of the electric power steering system;
   d) dynamically tuning the tuned vibration absorber to the frequency of the smooth road shake at the velocity responsive to the relationship for all frequencies of the frequency range except the mechanically tuned resonance frequency; and
   e) minimizing damping of the tuned vibration absorber to maximize rack stiffness at the frequency of the smooth road shake so as to thereby minimize smooth road shake at the steering wheel;
   wherein said steps of d) and e) comprise controlling current in the electric motor of the electric power steering system to provide an equivalent of an inertia of the electric power steering assembly which effects the dynamic tuning of said step d) and to provide a torque which effects the minimized damping of said step e).

19. The method of claim 18, wherein in said step b), the mechanical tuning of the electric power steering motor assembly to substantially a mid-range frequency of said frequency range to thereby provide the tuned vibration absorber having a mechanically tuned resonance frequency.

20. The method of claim 19, further comprising in said step e), speed-sensitive compensatory damping of the tuned vibration absorber so as to minimize inertial time lag introduced by step d) in providing the equivalent of an inertia of the electric power steering assembly.

21. The method of claim 20, further comprising periodically repeating said steps c) through e).

22. The method of claim 21, wherein steps c), d) and e) utilize a predetermined plurality of parameters of the motor vehicle, further comprising periodically evaluating the plurality of parameters for divergence exceeding a predetermined range, wherein if the divergence exceeds the predetermined range, then the plurality of parameters are updated responsive to the divergence.

23. The method of claim 22, wherein said steps d) and e) are performed on a electric power steering system having the electric motor thereof drivingly interfaced with the rack.

24. The method of claim 22, wherein said steps d) and e) are performed on a electric power steering system having the electric motor thereof drivingly interfaced with the steering column.

25. The method of claim 21, wherein steps c), d) and e) are frequency band limited proximate periodic excitation frequencies of the smooth road shake.

26. The method of claim 25, wherein said steps d) and e) are performed on a electric power steering system having the electric motor thereof drivingly interfaced with the rack.

27. The method of claim 25, wherein said steps d) and e) are performed on a electric power steering system having the electric motor thereof drivingly interfaced with the steering column.

* * * * *